United States Patent [19]

Vosteen

[11] 3,744,044
[45] July 3, 1973

[54] ELECTRONIC SYSTEM TO DETECT OBJECTS IN CONFINED VOLUME

[76] Inventor: Robert E. Vosteen, 315 West Center St., Medina, N.Y. 14103

[22] Filed: Apr. 21, 1971

[21] Appl. No.: 136,153

[52] U.S. Cl. ...... 340/213 R, 340/280 R, 340/267 R
[51] Int. Cl. ..................... G08b 13/00, G08b 13/24
[58] Field of Search .................... 340/280 R, 267 R, 340/213 R

[56] References Cited
UNITED STATES PATENTS

| | | | |
|---|---|---|---|
| 2,907,991 | 10/1959 | Van Allen | 340/207 R |
| 2,926,345 | 2/1960 | Roeger | 340/267 R X |
| 3,170,113 | 2/1965 | Harmon | 340/207 R X |
| 3,331,604 | 7/1967 | Mentzer et al. | 340/280 R X |
| 3,465,103 | 9/1969 | Lynch | 340/207 R X |
| 3,550,107 | 12/1970 | Thompson | 340/267 R |

*Primary Examiner*—Harold I. Pitts
*Attorney*—Irons, Sears, Staas, Halsey & Santorelli

[57] ABSTRACT

A system to detect changes in the contents of a defined sensitive volume wherein a detector having an active resonant circuit is connected in an oscillator circuit to create an internal field in the defined sensitive volume, the frequency of the oscillator being shifted by a sudden change in the contents of the defined sensitive volume affecting the internal field. A receiver is coupled to the oscillator circuit and responsive to changes in the frequency of the oscillator to produce an output indicative thereof. Feedback means connected between the output of the receiver and the oscillator provide tracking between the oscillator and the receiver in the zero to low frequency range. Detect means are connected to the output of the receiver to produce a detect signal in response to a change in the contents of the defined sensitive volume affecting the internal field. The system also includes indication means connected to the output of the detect means activated in response to detect signals to provide an indication of a change in the contents of the defined sensitive volume affecting the internal field, and error prevention means connected to the detect means and the indication means operative to prevent activation of the indication means in the event erroneous detect signals are produced.

8 Claims, 7 Drawing Figures

INVENTOR
ROBERT E. VOSTEEN 3,744,044

ELECTRONIC SYSTEM TO DETECT OBJECTS IN CONFINED VOLUME

BACKGROUND OF THE INVENTION

Field of the Invention

The invention relates to a detection system that reliably detects the sudden presence or absence of an object in a defined sensitive volume. It has particular utility, for example, for attachment to automatic production machinery to verify part production and release before allowing the machinery to proceed to produce the next part. A punch press, for example, must eject the part produced before permitting production of the next part or the press or die can be seriously damaged.

SUMMARY OF THE INVENTION

Applicant's invention provides a detector having a high frequency oscillator with a resonant circuit that produces an electromagnetic field. The resonant circuit may comprise, for example, a tank circuit including an inductive sensor coil and having a natural resonant frequency in the 10-100 megacycle range. Any distortion of the field produced by the tank circuit due to the presence of a foreign object therein will influence the inductance and/or capacitance of the tank circuit and will thereby shift the resonant frequency of the tank circuit.

The output of the oscillator is fed to an FM receiver tuned to produce an output signal proportional in amplitude to the resonant frequency shift of the tank circuit. The FM receiver may thereby detect whether or not a foreign object is even momentarily within the defined sensitive volume of the field produced by the tank circuit. Consequently, if correction is made for incidental FM and tank frequency drift, even the momentary presence or absence of a foreign object within the defined sensitive volume may be detected.

The output spectrum of the FM receiver is optimized for signal-to-noise ratio of the object to be detected. This optimized signal is fed to an absolute value circuit to insure a fixed polarity of output, independent of input polarity. The output of the absolute value circuit is connected to a trigger circuit that produces output pulses which affect relay closures and corresponding indications and/or alarms, depending upon whether or not an object is within the defined sensitive volume. Other features of the invention include a fail-safe circuit operative in the event of detector failure. Further, drift due to temperature shift, supply instability and detector contamination by oil and dirt accumulation is compensated for by means of an integrator automatic frequency control system which controls the average frequency of the detector and holds it at a preset average frequency independent of the above enumerated error introducing influences.

BRIEF DESCRIPTION OF THE DRAWINGS

FIG. 3 is a mechanical drawing of one particular type of sensor coil assemblage that may be employed in applicant's invention, wherein.

DETAILED DESCRIPTION OF THE INVENTION

Figure 2:
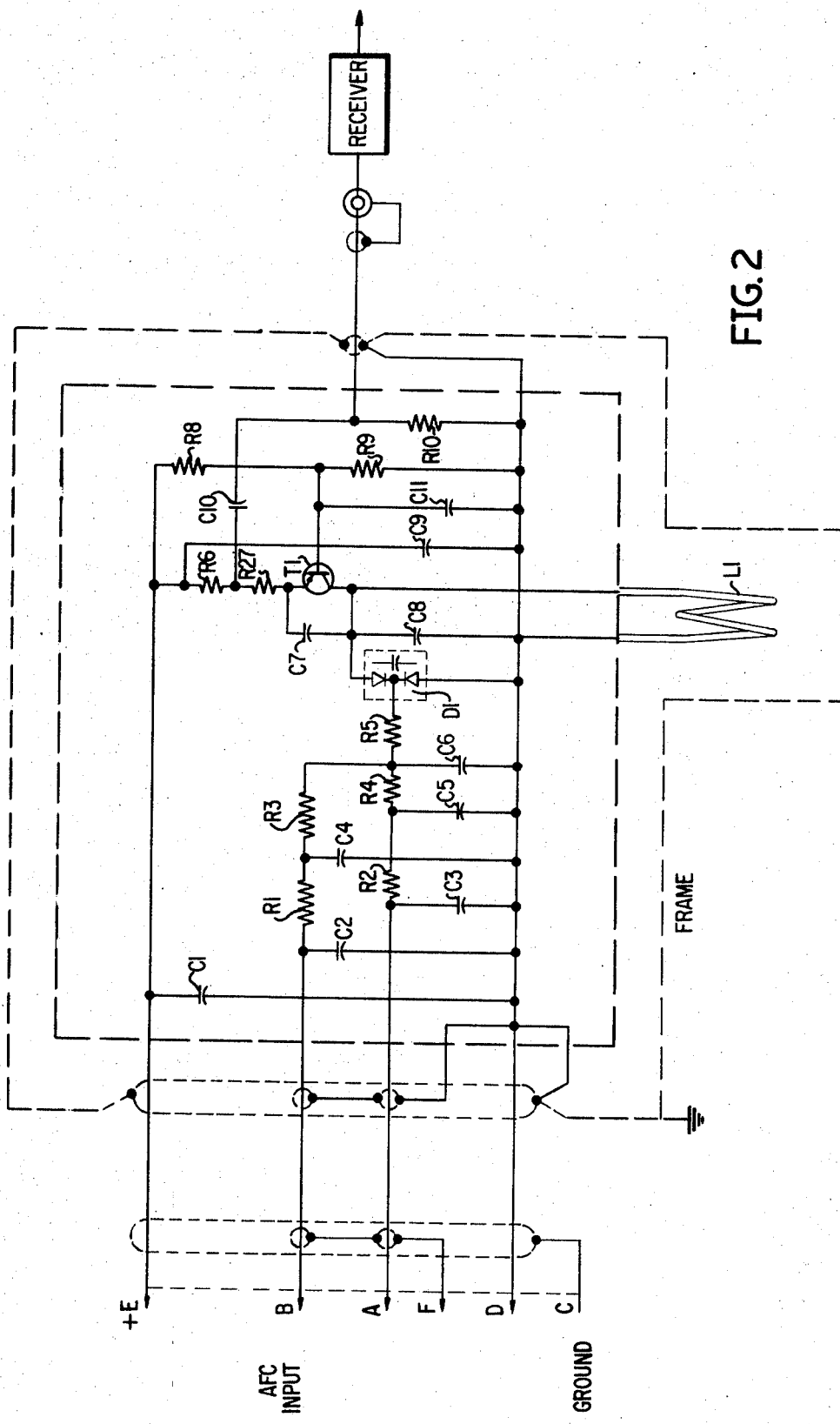
FIG. 2 is an electrical schematic diagram of the detector and oscillator elements comprising applicant's invention.

FIG. 2 is a schematic drawing of the oscillator circuit having a varying resonant frequency depending upon the contents of the defined sensitive volume. The resonant tank circuit of the oscillator comprises inductance L1 which may typically consist of a sensor coil having two or more turns, and produces an internal electromagnetic field.

Figure 1:
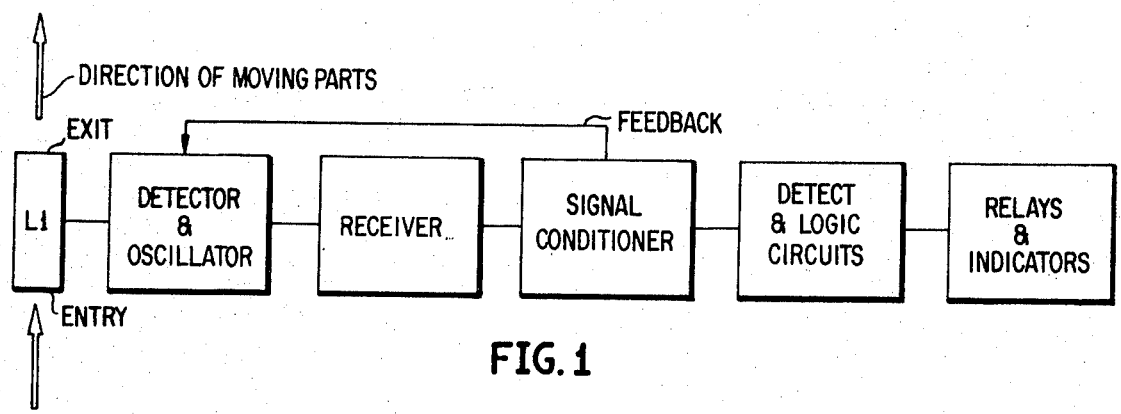
FIG. 1 is a block diagram of the detection system according to applicant's invention.
Figure 3B:
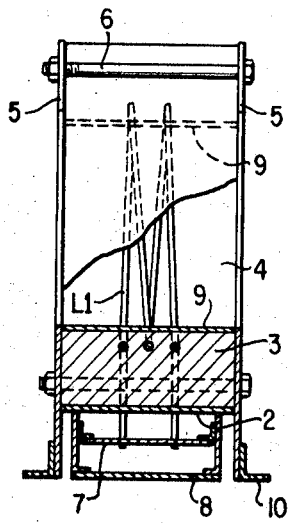
FIG. 3(b) is a partial sectional view taken along section A—A.
Figure 3A:
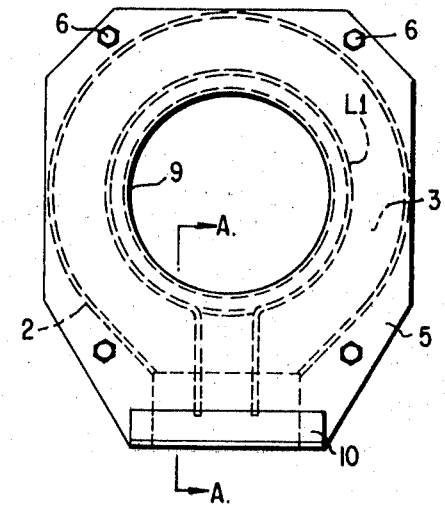
FIG. 3(a) is an end view of the assemblage.
Figure 3C:
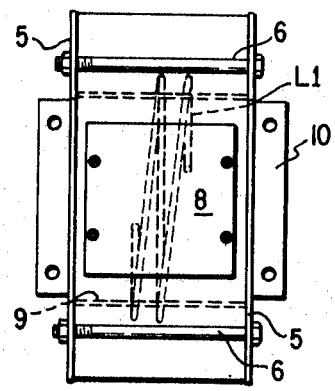
FIG. 3(c) is a side view of the assemblage.

The sensor coil and one possible form of its associated mechanical assemblage are shown in greater detail in FIG. 3. Sensor coil L1 is illustrated as comprising a two turn coil surrounded by conductive shield 2 which confines the electromagnetic field and thereby defines the sensitive volume 4. Sensor coil L1 is cast in dielectric foam material 3 to minimize any relative movement between the electrostatic shield 2 and the sensor coil L1. The defined sensitive volume 4 is slightly smaller in cross section than the inner dimensions of sensor coil L1. FIG. 3 illustrates the defined sensitive volume as being cylindrical. In particular it should be apparent that the defined sensitive volume 4 can take many forms in adapting to (1) the available space and (2) the shape and size of the object to be detected. Other typical forms may comprise squares and rectangles, for example. The conductive shield 2 defines entry and exit apertures to create a void between the limits of the shield and the inner portion of the sensor coil L1. The object being detected passes through this void and causes a change in the internal field and thus the oscillator frequency. The remaining structure illustrated in FIG. 3 comprises metallic end plates 5 which also function as conductive shields and associated end plate clamping rods 6. The detector may consist of a detector circuit board 7 surrounded by detector circuit shield box 8. The dielectric foam 3 is housed in dielectric rigid plastic abrasion resistant cylinder 9. Mounting brackets 10 are also shown in FIG. 1.

The sensor coil assemblage thus comprises a multiturn sensor coil surrounded by an electrostatic shield to confine the electromagnetic field produced by the coil, with the electrostatic shield defining apertures to permit the entry and exit of the object to be detected. The oscillator circuitry should be located in close proximity to the sensor coil to permit the use of the coil as a component of the resonant oscillator. The elements comprising the assemblage should be rigidly mounted with respect to each other and their surroundings to minimize incidental frequency modulation attributable to shock and vibration, and the dielectric foam in which the sensor coil is encased establishes fixed rigid geometry between the electrostatic shield and the sensor coil.

FIG. 2 shows the connection of sensor coil L1 in parallel with capacitor C8. The physical capacitance of the resonant tank circuit of the oscillator comprises dual varactor diode D1 and capacitor C8. The anode-to-anode capacitance of diode D1 is adjusted by the reverse biased DC voltage established between the varactor anode and cathode as discussed more fully hereafter, and thus permits remote tuning of the detector by means of a DC voltage. This provides a convenient technique in instances where the detector is relatively inaccessible. PNP transistor T1 functions in conjunction with the two terminal resonant circuit as an oscillator. It is connected in the grounded base configuration with positive feedback from the emitter of transistor T1 to the collector through the connection of capacitor C7 therebetween. Resisters R8 and R9 are connected between the positive supply terminal and DC common with the series connection of resistors R8 and R9 being connected to the base of transistor T1. Capacitor C11 is connected between the base of transistor T1 and DC common.

The described connection of resistors R8 and R9 bias the base of transistor T1 and capacitor C11 bypasses the base of transistor T1 to ground when it is operating in the grounded base mode.

Resistors R6 and R7 are connected between the positive supply terminal and the emitter of transistor T1, and the series connection of resistors R6 and R7 is connected through capacitor C10 to the output coaxial cable which feeds the receiver. Resistor R10 is connected between the output coaxial cable and DC common. A pulsed current at the resonant frequency will exist at the emitter of transistor T1 and therefore in resistors R7, R6 and R10. Capacitor C10 is a coupling capacitor and the combination of resistors R10 and R6 constitutes a low impedance source to drive the output coaxial cable.

The pulsed voltage that thus feeds the coaxial output is the input source for the receiver. Inasmuch as it is a pulsed voltage, it is rich in harmonics and the receiver can consequently be tuned to a harmonic of the resonant frequency of the oscillator. This, for example, enables the use of a receiver operating in the vicinity of 100 MHz while the oscillator can operate at any integral subharmonic between 10 MHz and 100 Mhz of the frequency to which the receiver is tuned. Because the receiver sensitivity must be high to insure a high noise output in the absence of a detector input signal, indicating the failure of the detector, there is no problem in producing an adequate signal level at a harmonic of the detector output.

It was previously discussed that it is desirable to tune the detector over a relatively wide range by the use of a remote DC signal. This DC signal must contain an extremely low level of ripple and noise to minimize incidental FM in the detector output which might in turn mask the desired signal. The low noise variable DC signal is fed through resistors R2, R4 and R5 to the varactor diode D1 and particularly to the cathode elements thereof. Resistors R1 and R3 are connected between terminal B and the series connection of resistors R4 and R5. The resistance values of resistors R1 and R3 are higher than those of resistors R2 and R4 and present a parallel path of lesser sensitivity to the varactor diode D1 through resistor R5 for the purpose of automatic frequency control of the detector. Capacitors C1, C2, C3, C4, C5, C6 and C9 function as RF bypass capacitors. The described detector is shown as operating from a single positive supply but it should be apparent to those in the art that a single negative supply can be employed in conjunction with an NPN transistor.

The receiver is shown connected to the coaxial cable output FIG. 2 and must be capable of being tuned to the fundamental or a harmonic of the detector frequency. Additionally, the receiver should have a direct coupled output, the output of the discriminator or ratio detector of an FM receiver being satisfactory. The amplitude limiting characteristic of the receiver should be good and the receiver should also have good sensitivity because it must provide a high level of noise output in the absence of an input signal indicative of the detector failure. Additionally, the receiver should have a DC output characteristic which increases with increasing input frequency, a coaxial input to minimize stray signal pick up, and an extremely low level of incidental FM.

Figure 4:
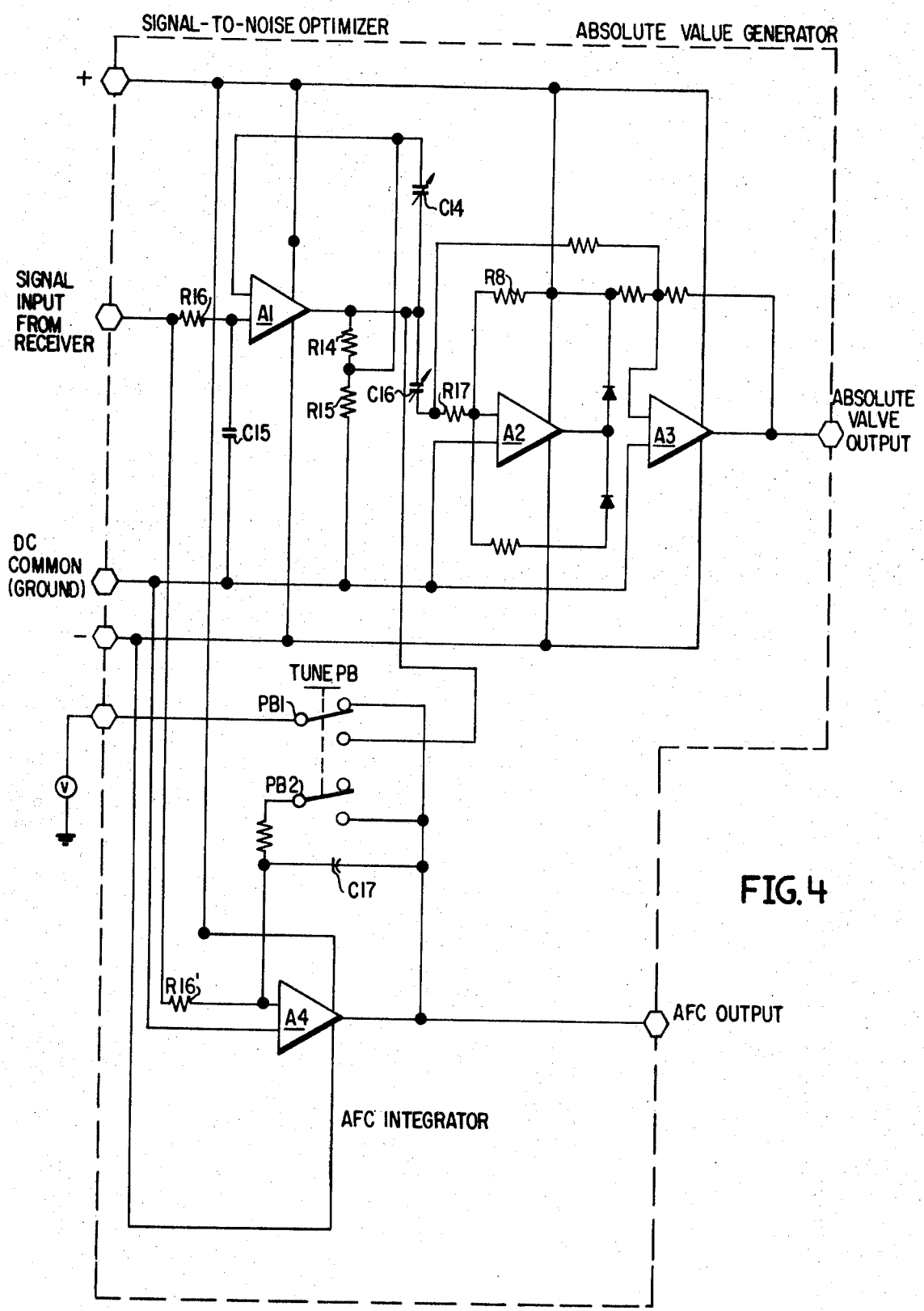
FIG. 4 is a detailed electrical schematic diagram of the signal-to-noise optimizer, absolute value generator and AFC integrator circuits of the invention.

FIG. 4 shows the signal conditioning circuit portions of the small object or part detector with the output of the receiver feeding the signal-to-noise optimizer. Amplifier A1 is connected as a DC amplifier with a non-inverting gain which may be typically on the order of 100 through the feedback resistive network comprising resistors R14 and R15. Resistor R14 is shunted by variable capacitor C14, the combination having a time constant (T1) equal to (R14 × C14) which determines the high frequency roll-off of amplifier A1. The capacitance of variable capacitor C14 is selected to optimize the high frequency-to-noise ratio of the output signal of amplifier A1.

Resistor R16 is connected between the output of the receiver and the input of amplifier A1 and capacitor C15 is connected between the series connection of resistor R16 and said amplifier A1 input and DC common. The relative values of resistor R16 and capacitor C15 are selected to provide additional high frequency noise suppression.

Variable capacitor C16 is connected between the output of amplifier A1 and the input to the absolute value generator and functions as the input coupling capacitor to the absolute value generator. Capacitor C16 determines the low frequency roll-off of the input to the absolute value generator and the value of its capacitance is selected to optimize the low frequency-to-noise ratio and thereby minimize the influence of low frequency vibration effects to the small parts detector.

In resume, the function of amplifier A1 operating as a signal-to-noise optimizer is to control the low and high frequency roll-off feeding the absolute value generator. The latter is in essence an "ultra-linear full-wave rectifier" and is a well-known circuit. Consequently, detailed explanation of this circuit is not provided herein. The absolute value generator functions to generate a DC output signal equal in amplitude to the alternating voltage appearing at the common connection of resistors R17 and R18 and capacitor C16. The output of the absolute value generator is always negative in polarity but of identical magnitude to the input signal, regardless of the polarity of the input signal. Inasmuch as the absolute value generator generates an output of a given polarity independent of the input polarity, a sudden increase or decrease in detector frequency of equal magnitude will generate an identical output signal from amplifier A3.

In the event of detector failure it is desirable to provide an alarm so as not to inaccurately record the presence of an object within the defined sensitive area if in fact an object is not present. It was discussed above that the receiver should have very good sensitivity with the result that a high noise level is at the receiver output when the oscillator is disabled. This high noise level will be demodulated by the absolute value generator circuit whose input is capacitor coupled by capacitor C16, and which therefore has no DC component of input signal. The presence of a large DC component at the amplifier A3 output of the absolute value generator would thus be evidence of detector failure and a suitable alarm circuit can be connected to the output of the absolute value generator to give an indication of detector failure. If this DC component were to be ignored the high noise level could otherwise be construed as a valid detect signal.

The small parts or objects detector according to the invention also comprises an automatic frequency control (AFC) integrator circuit to provide tracking of low frequency or DC components of the oscillator frequency deviation to the receiver. Typically, the low frequency components would be in the infrasonic range. Inasmuch as the output from the receiver normally contains no DC component, the average DC output of the receiver is zero. In the event the detector shifts in frequency for any reason such as a gradual accumulation of dirt or oil, a low frequency or DC component will have time to develop at the receiver output. This low frequency or DC component as shown in FIG. 3 will be fed to the input of the AFC integrator circuit and particularly through resistor R16' to the output of amplifier A4 which comprises a conventional analog integrator comprising an operational amplifier with capacitor C17 connected as the feedback capacitor. The output of amplifier A4 is a negative integral of the receiver output. This is the AFC output and feeds the detector AFC input as shown in FIG. 1.

Equilibrium or zero output from the receiver will be reestablished when the AFC integrator output reaches that value which reestablishes the correct output frequency from the detector, to wit, the frequency to which the receiver is tuned. The AFC action described is thus the opposite of a conventional FM receiver in that the receiver tuning remains at a fixed frequency and the AFC functions to shift the frequency of the RF source, the detector in this case, to reestablish the source frequency at the desired frequency. This procedure is preferable over shifting the frequency of the receiver local oscillator because it permits the system to operate at a fixed unused frequency and thus permits possible interference due to the detector shifting in frequency and possibly crossing a frequency on which another signal exists. If the interfering signal were stronger, although this is not likely, the receiver would lock into the wrong signal and the system would cease to function.

It was previously discussed in relation to FIG. 2 that the detector may be remotely tuned by means of a second DC source feeding varactor diode D1. In order to accomplish this, a dual contact push-button switch PB is connected as shown in FIG. 3. A tuning meter V is also shown in FIG. 3 and is normally connected to the output of the AFC integrator through normally closed contact PB1 through ground. Thus, meter V normally continuously meters the AFC integrator output signal feeding the detector. In the event this signal approaches the linear limits of the integrator's capability, the detector should be retuned to establish a normal integrated voltage nearer to zero volts out. This retuning is accomplished by first depressing switch PB which (1) shorts the AFC integrator by affecting a short circuit through contact PB2 and (2) connects the meter to the amplified receiver output of amplifier A1 of the signal-to-noise optimizer. The detector can now be retuned to a frequency producing an output from amplifier A1 near zero volts, and thus nearer the correct frequency, at which time the push-bottom switch PB can be released to cause the AFC integrator to correct for any residual mistuning.

Figure 5:
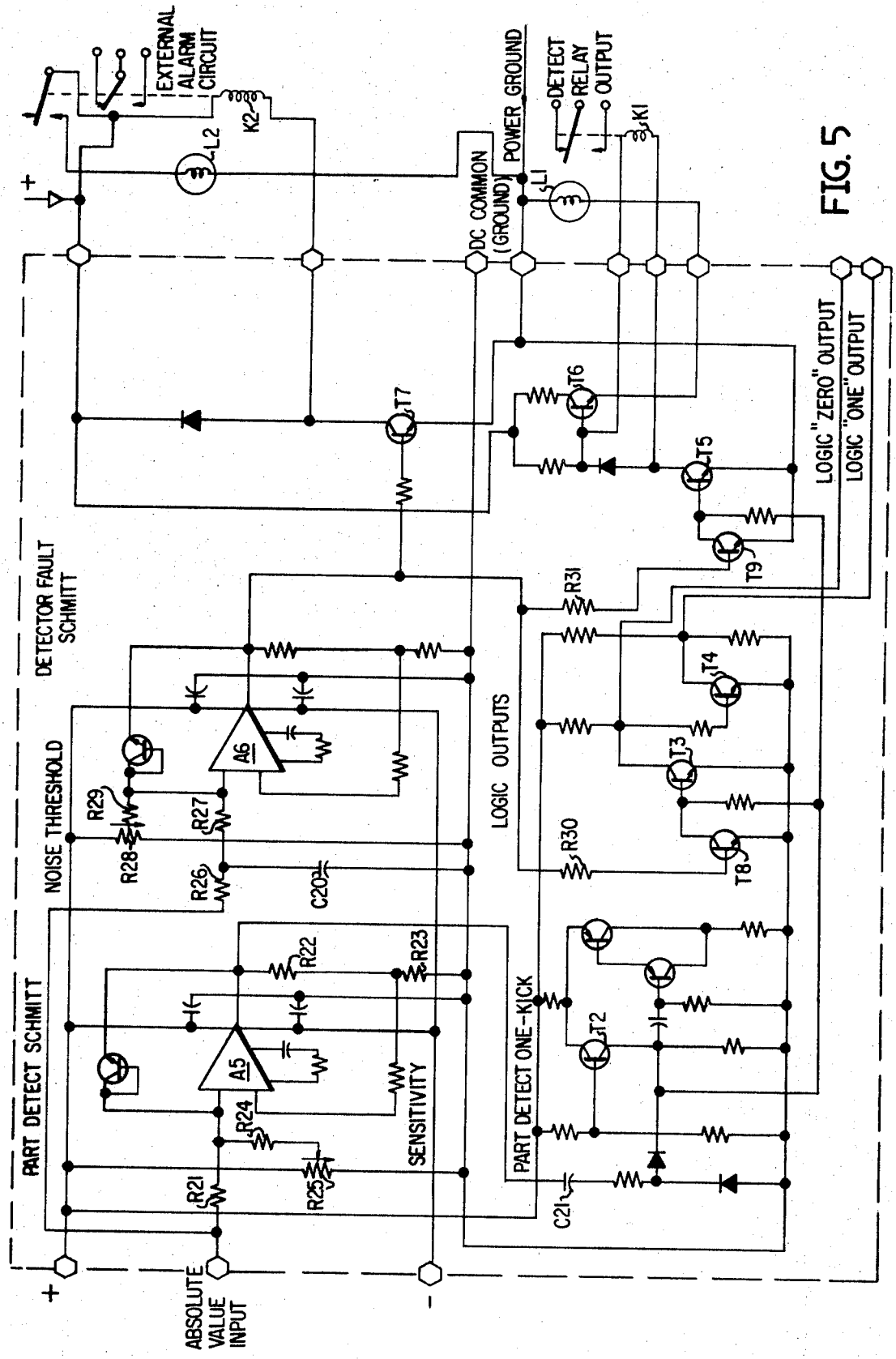
FIG. 5 is an electrical schematic diagram of the circuits to which the absolute value output of FIG. 4 is applied, and details particular logic and detector circuits which function to give an accurate indication of even the momentary presence of an object within the defined sensitive volume.

The output of the absolute value generator is applied to two Schmitt trigger circuits as shown in FIG. 5, namely, amplifier A5 which comprises the object or part detect Schmitt trigger circuit and amplifier A6 which comprises the detector fault Schmitt trigger circuit. Amplifiers A5 and A6 are connected in conventional operational amplifier form and in conjunction with other elements comprise conventional Schmitt trigger circuits. Hence, detailed discussion thereof is not included herein. When a negative going output is applied to amplifier A5 through resistor R21 fed from the absolute value output and it crosses the trip level, which may for example be negative but near zero volts, the part detect Schmitt output jumps to a positive voltage (which may be approximately 9 volts for example). When the signal applied to amplifier A5 crosses back going positively, the Schmitt output jumps to a negative voltage. (Which may be approximately 0.6 volts for example.) Positive feedback is provided from the output of amplifier A6 through resistors R22 and R23 to produce hysteresis to reduce the chance of triggering due to a noisy signal.

An adjustable positive DC signal labeled sensitivity is applied through resistor R24 to the input of operational amplifier A5. The amplitude of the positive DC signal may be varied by varying the setting of the potentiometer comprising resistor R25 connected between the positive supply terminal and DC common. By adjusting the sensitivity control, the minimum negative signal necessary for triggering the part detect Schmitt circuit can be established. The part detect Schmitt trigger circuit will then ignore all input signals having a peak DC negative voltage less than this preset threshold.

It was previously discussed that a steady DC component is developed at the absolute value output because of the high noise content at the receiver output in the event of detector failure. The detector fault Schmitt trigger circuit is very similar to the already described part detect Schmitt trigger circuit except that its signal input is filtered by the low pass filter network comprising resistor R26 and capacitor C20 connected between the absolute value input and DC common. Resistor R27, connected between the series connection of resistor R26 and capacitor C20, and the input terminal of operational amplifier A6, serves the same function as resistor R21 connected between the absolute value input and the input of operational amplifier A5. Consequently, the detector fault Schmitt trigger circuit will not trigger except in the event of a sustained DC component, which is the circumstance existing in the event of detector failure. This threshold of operation for the detector fault Schmitt trigger circuit can be preset by the noise threshold control, which comprises resistor R28 connected as a potentiometer between the absolute value output and DC common, and its connection through resistor R29 to the input of operational amplifier A6. The noise threshold circuit thus functions similarly to the sensitivity control circuit.

The part detect Schmitt trigger circuit feeds the part detect one-kick circuit by the connection to the latter of the output of operational amplifier A5. A positive pulse from the output of the part detect Schmitt trigger circuit to the part detect one-kick circuit causes the latter to generate a single positive pulse of fixed amplitude and width at its output for each part detect Schmitt trigger output, regardless of the duration of the part detect Schmitt output. The part detect one-kick circuit is a conventional monostable multivibrator whose positive input pulse is fed through capacitor C21 and whose positive output is developed at the collector of transistor T2. Because it is a conventional monostable multivibrator circuit, the other elements comprising the part detect one-kick circuit will not be described because operation thereof is apparent to one in the art.

Two logic circuits are provided, one being inverted with respect to the other. In the event a part is detected, transistor T3 which inverts the part detect one-kick output goes from a logic 1 to a logic 0 state. Transistor T3 also feeds transistor T4, a second inverter which therefore in the event of a detected part goes from a logic 0 to a logic 1 output.

The output of the part detect one-kick circuit also feeds the detect relay through the relay driver comprising transistor T5. Thus when a part is detected within the defined sensitive volume, transistor T5 is driven to the conducting state for a fixed time interval through the part detect one-kick circuit and relay K1 is energized for this fixed interval to activate the detect relay output. Correspondingly, transistor T5 also drives transistor T6 which functions as a constant current driver for detect light L1 which provides a visual indication of a detect signal.

In the event of a control system failure in the receiver, signal conditioning, power failure, etc., a detect output will not exist if the system is fail-safe. However, in the event of detector failure, unless precautions are taken, the noise at the receiver output could be construed as a great proliferation of valid signals by the circuitry. To prevent this malfunction, the detector fault Schmitt trigger circuit is triggered as previously described. This Schmitt circuit drives transistor T3, a relay driver, which activates detector fault relay K2 and thereby an external alarm through the external alarm contacts. The connection to the detector fault light L2 is similarly completed through activation of relay K2.

To simultaneously shut down the automatic system in the event of a detector fault, the detector fault Schmitt trigger circuit drives transistors T8 and T9, the bases of these transistors being connected through resistors R30 and R31, respectively, to the output of the detector fault Schmitt trigger circuit. In the event of a detector fault, activated transistor T8 shunts the input to the logic circuits and prevents a detect signal output. Similarly, activated transistor T9 shunts the input to the detect relay driver, thus preventing actuation of the detect relay.

The system according to the invention is capable of reliably detecting a part (1) whose volume is less than 10 parts per million of the defined sensitive volume, (2) which interjects any path through the defined sensitive volume, and (3) which moves through the defined sensitive volume at very high speed. It should be apparent that the problems associated with detection of relatively larger objects or objects moving at a relatively slower speed is easier. In addition to determining the presence or absence of an object from the defined sensitive volume, it is also possible to utilize the invention to measure the size or speed of objects or parts.

It should be apparent to those in the art that modifications and substitutions of equivalent circuit elements may be made to applicant's invention without departing from the scope thereof. For example, while the specification and drawings show tracking of the oscillator to the receiver, the reverse, that is tracking of the receiver to the oscillator, may also be provided.

I claim:

1. A system to detect changes in the contents of a defined sensitive volume comprising:
   a detector having an active resonant circuit connected in an oscillator circuit to create an internal field in the defined sensitive volume, the frequency of the oscillator being shifted by a sudden change in the contents of the defined sensitive volume affecting the internal field,
   a receiver coupled to the oscillator circuit and responsive to changes in the frequency of the oscillator to produce an output indicative thereof,
   feedback means connected between the output of the receiver and the oscillator to provide tracking between the oscillator and the receiver in the zero to low frequency range,
   detect means connected to the output of the receiver to produce a detect signal in response to a change in the contents of the defined sensitive volume affecting the internal field,
   indication means connected to the output of the detect means activated in response to detect signals to provide an indication of a change in the contents of the defined sensitive volume affecting the internal field,
   error prevention means connected to the detect means and the indication means operative to prevent activation of the indication means in the event erroneous detect signals are produced.

2. A system to detect changes as recited in claim 1 wherein there is tracking of the oscillator to the receiver.

3. A system to detect changes as recited in claim 2 wherein the feedback means comprise an integrator to reduce the average output error of the receiver to substantially zero.

4. A system to detect changes in the contents of a defined sensitive volume comprising:
   a detector having an active resonant circuit connected in an oscillator circuit to create an internal field in the defined sensitive volume, the frequency of the oscillator being shifted by a sudden change in the contents of the defined sensitive volume affecting the internal field,
   a receiver coupled to the oscillator circuit and responsive to changes in the frequency of the oscillator to produce an output indicative thereof,
   signal conditioning means comprising a signal-to-noise optimizer connected to the output of the receiver to optimize the signal-to-noise ratio of the receiver output,
   feedback means connected between the signal conditioning means and the oscillator to provide tracking between the oscillator and the receiver in the zero to low frequency range, detect means connected to the output of the signal conditioning means to produce a detect signal in response to a change in the contents of the defined sensitive volume affecting the internal field, indication means connected to the output of the detect means activated in response to detect signals to provide an indication of a change in the contents of the defined sensitive volume affecting the internal field, error prevention means connected to the detect means and the indication means operative to prevent activation of the indication means in the event erroneous detect signals are produced.

5. A system to detect changes as recited in claim 4 wherein there is tracking of the oscillator to the receiver.

6. A system to detect changes as recited in claim 5 wherein the feedback means comprise an integrator to reduce the average output error of the receiver to substantially zero.

7. A system to detect changes as recited in claim 4 wherein the signal conditioning means further comprise an absolute value generator connected between the signal-to-noise optimizer and the detect means to produce a single polarity output in response to an input of either polarity.

8. A system to detect changes as recited in claim 7 wherein the signal conditioning means is connected to produce a DC component in the event of detector failure and the error prevention means comprise a detector failure circuit operative in response to said DC component to inactivate the indication means.

* * * * *